United States Patent
Onoda et al.

(10) Patent No.: US 10,115,021 B2
(45) Date of Patent: Oct. 30, 2018

(54) SCOREBOOK CREATING APPARATUS, SCOREBOOK CREATING SYSTEM, SCOREBOOK CREATING METHOD, PROGRAM, IMAGING DEVICE, AND REPRODUCING METHOD

(71) Applicant: JVC KENWOOD Corporation, Yokohama-shi, Kanagawa (JP)

(72) Inventors: Hideaki Onoda, Yokohama (JP); Jiro Uzaki, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/181,500

(22) Filed: Jun. 14, 2016

(65) Prior Publication Data
US 2016/0375341 A1    Dec. 29, 2016

(30) Foreign Application Priority Data

Jun. 24, 2015 (JP) ................................ 2015-126918
Sep. 29, 2015 (JP) ................................ 2015-191991

(51) Int. Cl.
*H04N 9/80* (2006.01)
*G06K 9/00* (2006.01)

(52) U.S. Cl.
CPC ..... *G06K 9/00744* (2013.01); *G06K 9/00724* (2013.01); *G06K 2009/00738* (2013.01); *G06K 2209/27* (2013.01)

(58) Field of Classification Search
CPC ........... G06K 9/00724; G06K 2209/27; G06K 2009/00738; G06K 9/00744

USPC .......................................................... 386/240
See application file for complete search history.

(56) References Cited

U.S. PATENT DOCUMENTS

| | | | |
|---|---|---|---|
| 7,446,803 B2 | 11/2008 | Leow et al. | |
| 9,245,271 B1* | 1/2016 | Ahmed | .................. G06Q 30/00 |
| 2002/0176000 A1* | 11/2002 | Katayama | .......... H04N 7/17318 |
| | | | 348/157 |
| 2014/0074855 A1* | 3/2014 | Zhao | .................... G06F 17/3002 |
| | | | 707/746 |
| 2016/0172005 A1* | 6/2016 | Oguchi | ................ G11B 27/034 |
| | | | 386/241 |

FOREIGN PATENT DOCUMENTS

| | | |
|---|---|---|
| JP | 2007-029313 | 2/2007 |
| JP | 2007-515136 | 6/2007 |

* cited by examiner

*Primary Examiner* — William Tran
(74) *Attorney, Agent, or Firm* — Amin, Turocy & Watson LLP

(57) ABSTRACT

A scorebook creating apparatus includes a detecting unit that detects first information that indicates a starting point of a scene included in picture data; a temporary-tag creating unit that creates a temporary tag including time information of the first information when the detecting unit detects the first information; a tag-identification (ID) assigning unit that issues, when second information is input from an external unit, a tag ID for associating the temporary tag with the second information to assign the tag ID to the second information; and a scorebook processing unit that creates a scorebook by the second information. The temporary-tag creating unit makes a set of the last temporary tag before the tag ID is issued and the tag ID.

10 Claims, 12 Drawing Sheets

FIG.9

| TEMPORARY-TAG TIME INFORMATION | TAG ID |
|---|---|
| 0:03:05 | TAG0001 |
| 0:03:21 | TAG0002 |
| 0:03:55 | TAG0003 |
| ⋮ | ⋮ |
| 0:15:31 | TAG0015 |
| ⋮ | ⋮ |

FIG.10

| BATTING RECORD | INNING | TOP/END | BATTING ORDER | PERSONAL ID | BATTER SCORE INFORMATION | RUNNER SCORE INFORMATION | | | TAG ID |
|---|---|---|---|---|---|---|---|---|---|
| | | | | | | FIRST BASE RUNNER (PERSONAL ID) | SECOND BASE RUNNER (PERSONAL ID) | THIRD BASE RUNNER (PERSONAL ID) | |
| ... | 1 | TOP | ... | ... | ... | ... | ... | ... | ... |
| A005 | 2 | TOP | 5 | 005 | BALL, ETC. | — | — | — | TAG0015 |
| ... | ... | ... | ... | ... | ... | ... | ... | ... | ... |
| A008 | 2 | TOP | 5 | 005 | SINGLE HIT, ETC. | — | — | — | TAG0018 |
| A009 | 2 | TOP | 6 | 006 | BALL, ETC. | — (005) | — | — | TAG0019 |
| ... | ... | ... | ... | ... | ... | ... | ... | ... | ... |
| A011 | 2 | TOP | 6 | 006 | SINGLE HIT, ETC. | SECOND BASE (005) | — | — | TAG0021 |
| A012 | 2 | TOP | 7 | 007 | SINGLE HIT, ETC. | SECOND BASE (006) | THIRD BASE (005) | — | TAG0022 |
| A013 | 2 | TOP | 8 | 008 | FOUL, ETC. | — | — (006) | — (005) | TAG0023 |
| ... | ... | ... | ... | ... | ... | ... | ... | ... | ... |
| A015 | 2 | TOP | 8 | 008 | STRIKE OUT, ETC. | — | — (006) | — (005) | TAG0025 |
| A016 | 2 | TOP | 9 | 009 | STRIKE, ETC. | — | — (006) | — (005) | TAG0026 |
| ... | ... | ... | ... | ... | ... | ... | ... | ... | ... |
| A018 | 2 | TOP | 9 | 009 | SINGLE HIT, ETC. | — | HOME BASE (006) | HOME BASE (005) | TAG0028 |
| ... | ... | ... | ... | ... | ... | ... | ... | ... | ... |
| ... | ... | ... | ... | ... | ... | ... | ... | ... | ... |

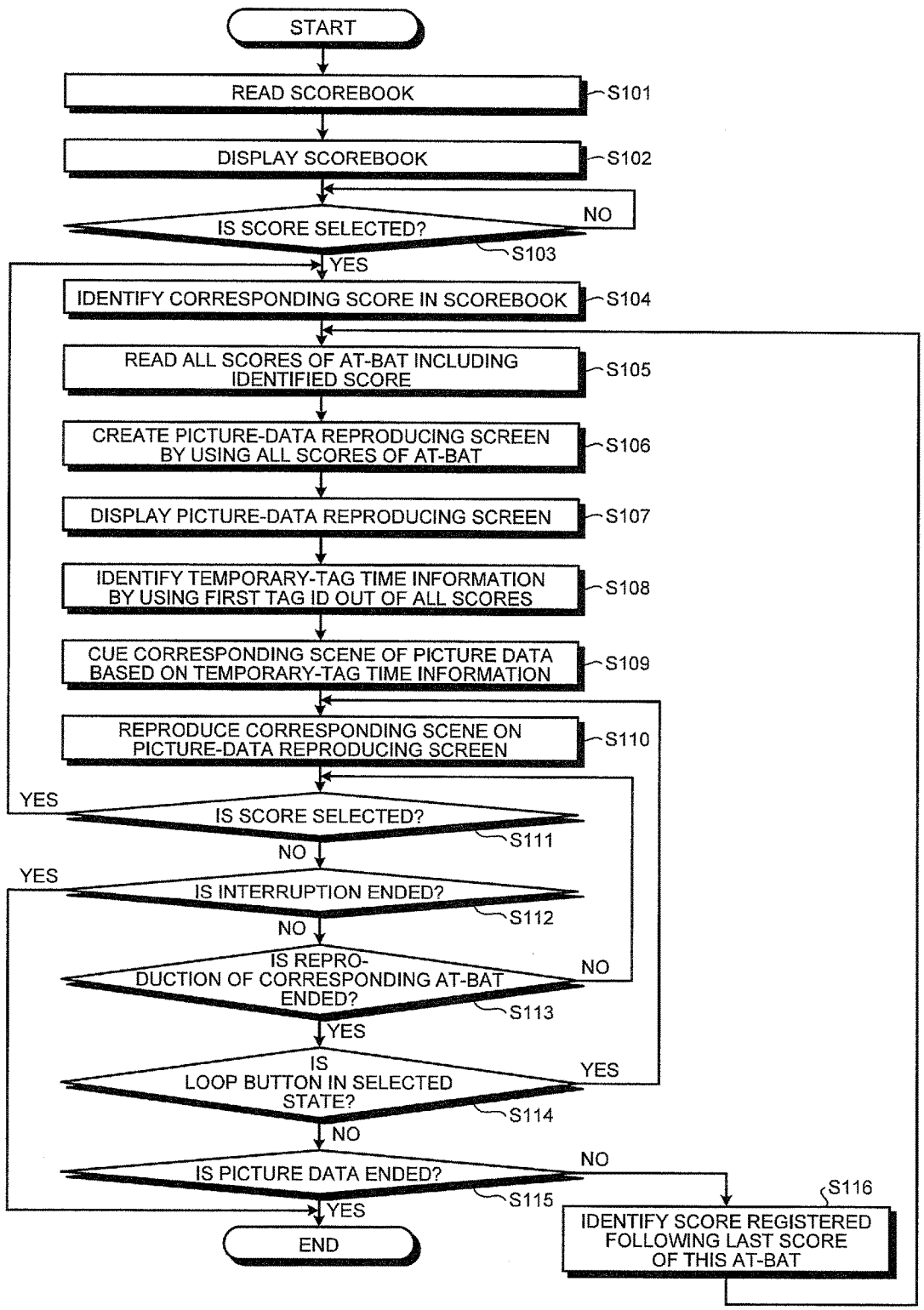

SCOREBOOK CREATING APPARATUS, SCOREBOOK CREATING SYSTEM, SCOREBOOK CREATING METHOD, PROGRAM, IMAGING DEVICE, AND REPRODUCING METHOD

CROSS-REFERENCE TO RELATED APPLICATION(S)

The present application claims priority to and incorporates by reference the entire contents of Japanese Patent Application No. 2015-191991 filed in Japan on Sep. 29, 2015 and Japanese Patent Application No. 2015-126918 filed in Japan on Jun. 24, 2015.

BACKGROUND OF THE INVENTION

Field of the Invention

The present invention relates to a scorebook creating apparatus, a scorebook creating system, a scorebook creating method, a program, an imaging device, and a reproducing method.

Description of the Related Art

Conventionally, a baseball scorebook has been created by recording on a special sheet by a scorer. Therefore, the scorer has been expected to learn a variety of symbols and special recording rules. Moreover, in recent years, a technique of supporting creation of scorebooks with a personal computer and the like has been developed (Japanese Laid-open Patent Publication Nos. 2007-29313 and 2007-515136).

For example, in Japanese Laid-open Patent Publication No. 2007-29313, a technique of simplifying input by automatically advancing a runner based on a batting result selected from among selection items when the advance of the runner is uniquely determined corresponding to getting on base of a batter, and by manually inputting as for an advance that cannot be processed by the automatic advance has been disclosed.

However, in a scorebook created conventionally, although a batting result or an advancing result of each batter can be seen according to a variety of symbols and special recording rules, it has been difficult to see detailed information about a cooperation state of fielders at that time, an advancing state of a runner, and the like from an image.

SUMMARY OF THE INVENTION

It is an object of the present invention to at least partially solve the problems in the conventional technology.

The present invention is achieved in view of the above problem, and it is an object thereof to provide a scorebook creating apparatus, a scorebook creating system, a scorebook creating method, a program, an imaging device, and a reproducing method that enable to facilitate checking of a desired image.

According to an embodiment of the present invention, there is provided a scorebook creating apparatus comprising: a detecting unit that detects first information that indicates a starting point of a scene included in picture data; a temporary-tag creating unit that creates a temporary tag including time information of the first information when the detecting unit detects the first information; a tag-identification (ID) assigning unit that issues, when second information is input from an external unit, a tag ID for associating the temporary tag with the second information to assign the tag ID to the second information; and a scorebook processing unit that creates a scorebook by the second information, wherein the temporary-tag creating unit makes a set of the last temporary tag before the tag ID is issued and the tag ID.

According to another embodiment of the present invention, there is provided a scorebook creating system comprising: an imaging unit that images a picture to create picture data; a detecting unit that detects first information that indicates a starting point of a scene included in the picture data; a temporary-tag creating unit that creates a temporary tag including time information of the first information when the detecting unit detects the first information; a tag-identification (ID) assigning unit that issues, when second information is input from an external unit, a tag ID for associating the temporary tag with the second information to assign the tag ID to the second information; a scorebook processing unit that creates a scorebook by the second information; and a storage unit that stores the picture data, the temporary tag, the second information, and the tag ID, wherein the temporary-tag creating unit makes a set of the last temporary tag before the tag ID is issued and the tag ID.

According to another embodiment of the present invention, there is provided a scorebook creating method that is performed by a system including a detecting unit, a temporary-tag creating unit that creates a temporary tag, a tag-ID assigning unit that issues a tag ID, and a scorebook processing unit that creates a scorebook, the method comprising: detecting, by the detecting unit, first information that indicates a starting point of a scene included in picture data; creating, by the temporary-tag creating unit, a temporary tag including time information of the first information when the detecting unit detects the first information; issuing, by the tag-ID assigning unit, when second information is input from an external unit, a tag ID for associating the temporary tag with the second information to assign the tag ID to the second information; and making a set of the last temporary tag before the tag ID is issued and the tag ID by the temporary-tag creating unit.

According to another embodiment of the present invention, there is provided a non-transitory computer-readable medium storing a program that causes an apparatus that includes a detecting unit, a temporary-tag creating unit that creates a temporary tag, a tag-ID assigning unit that issues a tag ID, and a scorebook processing unit that creates a scorebook to function, the program causing: the detecting unit to detect first information that indicates a starting point of a scene included in picture data; the temporary-tag creating unit to create a temporary tag including time information of the first information when the detecting unit detects the first information; the tag-ID assigning unit to issue, when second information is input from an external unit, a tag ID for associating the temporary tag with the second information to assign the tag ID to the second information; and the temporary-tag creating unit to make a set of the last temporary tag before the tag ID is issued and the tag ID.

According to another embodiment of the present invention, there is provided an imaging device comprising: a detecting unit that detects first information that indicates a starting point of a scene included in picture data; and a temporary-tag creating unit that creates a temporary tag including time information of the first information when the detecting unit detects the first information, wherein the temporary-tag creating unit receives a tag ID for associating second information corresponding to the scene with the scene from an external unit, and makes a set of the received tag ID and the temporary tag.

Furthermore, according to another embodiment of the present invention, there is provided a reproducing method that is performed by an apparatus accessible to at least one storage region in which picture data, a temporary tag including time information of first information that indicates a starting point of a scene included in the picture data, second information constituting a scorebook, and a tag ID that associates the temporary tag with the second information, and includes displaying the scorebook constituted of the second information; accepting selection of the second information in the scorebook; identifying the temporary tag that is associated with the selected second information by using the tag ID; identifying the starting point of the scene in the picture data by the time information that is included in the identified temporary tag; and reproducing and displaying the picture data by the identified starting point of the scene.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a schematic diagram showing a data structure example of a temporary tag file that is created by the embodiment;

FIG. 10 is a schematic diagram showing a data structure example of a scorebook that is created by the embodiment;

FIG. 14 is a flowchart showing one example of a reproducing operation according to the embodiment.

DETAILED DESCRIPTION OF THE PREFERRED EMBODIMENTS

Embodiments of a scorebook creating apparatus, a scorebook creating system, a scorebook creating method, a program, an imaging device, and a reproducing method are explained in detail below with reference to the accompanying drawings. Specific values, external configurations, and the like indicated in the embodiments are only examples to facilitate understanding of the present invention, and the present invention is not limited thereto unless otherwise specified. As for components that are not directly related to the present invention, detailed explanation and illustration are omitted.

Figure 1:
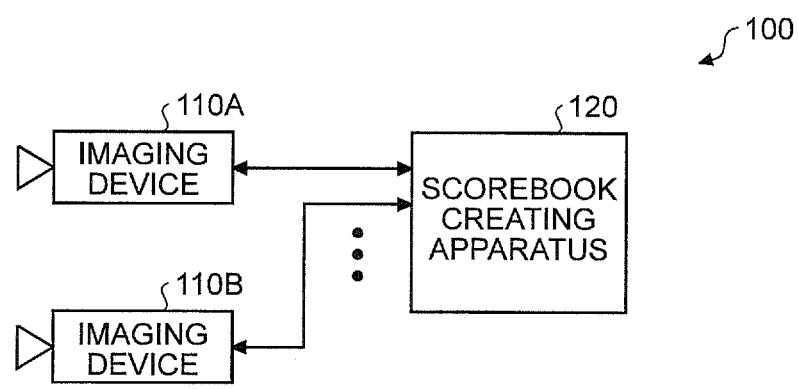
FIG. 1 is a diagram showing a schematic configuration example of a scorebook creating system according to an embodiment.

FIG. 1 is a diagram showing a schematic configuration example of a scorebook creating system 100 according to an embodiment. As shown in FIG. 1, the scorebook creating system 100 includes a scorebook creating apparatus 120, and multiple imaging devices 110A, 110B, . . . Note that when explaining the multiple imaging device 110A, 110B, . . . , the reference symbol 110 is used for the imaging devices.

The imaging devices 110 may be, for example, a video camera, a digital camera, and the like that are capable of taking a moving image. The scorebook creating apparatus 120 may be a personal computer that is equipped with an information processing device such as a central processing unit (CPU).

The scorebook creating apparatus 120 and the imaging devices 110 are connected through, for example, a data communication unit, so as to enable data transfer. This data communication unit may be of wired or of wireless. To the data communication unit, various kinds of data communication means, such as a public network, a mobile communication network, the Internet, a local area network (LAN), Bluetooth (registered trademark), and a universal serial bus (USB), can be applied.

Figure 2:
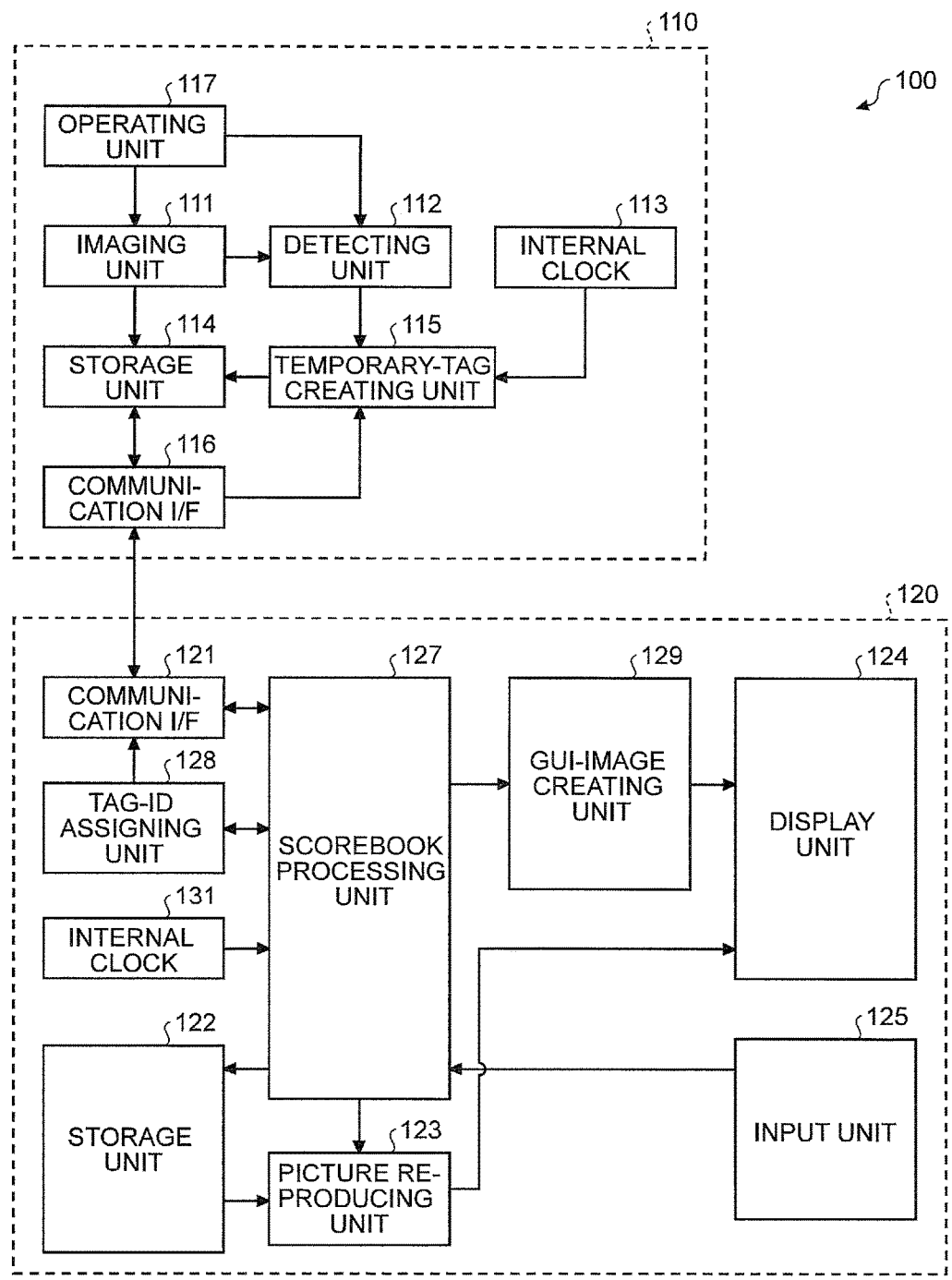
FIG. 2 is a block diagram showing a schematic configuration example of the scorebook creating system according to the embodiment.

FIG. 2 is a block diagram showing a schematic configuration example of the scorebook creating system 100 according to the embodiment. As shown in FIG. 2, the imaging device 110 includes an imaging unit 111, a detecting unit 112, an internal clock 113, a storage unit 114 that stores a temporary tag file, a temporary-tag creating unit 115, a communication interface (I/F) 116, and an operating unit 117. The detecting unit 112 and the temporary-tag creating unit 115 may be implemented by an information processing device such as a CPU included in the imaging device 110, or may be implemented by a dedicated chip that performs a function of each component.

The scorebook creating apparatus 120 includes a communication I/F 121, a storage unit 122 that stores a score, a picture reproducing unit 123, a display unit 124, an input unit 125, a scorebook processing unit 127, a tag-identification (ID) assigning unit 128, a GUI-image creating unit 129, and an internal clock 131. The scorebook processing unit 127 and the tag-ID assigning unit 128 may be implemented by an information processing device such as a CPU included in the scorebook creating apparatus 120, or may be implemented by a dedicated chip that performs a function of each component. Moreover, the internal clock 113 in the imaging device 110 and the internal clock 131 in the scorebook creating apparatus 120 are not necessarily required to be synchronized.

Figure 3:
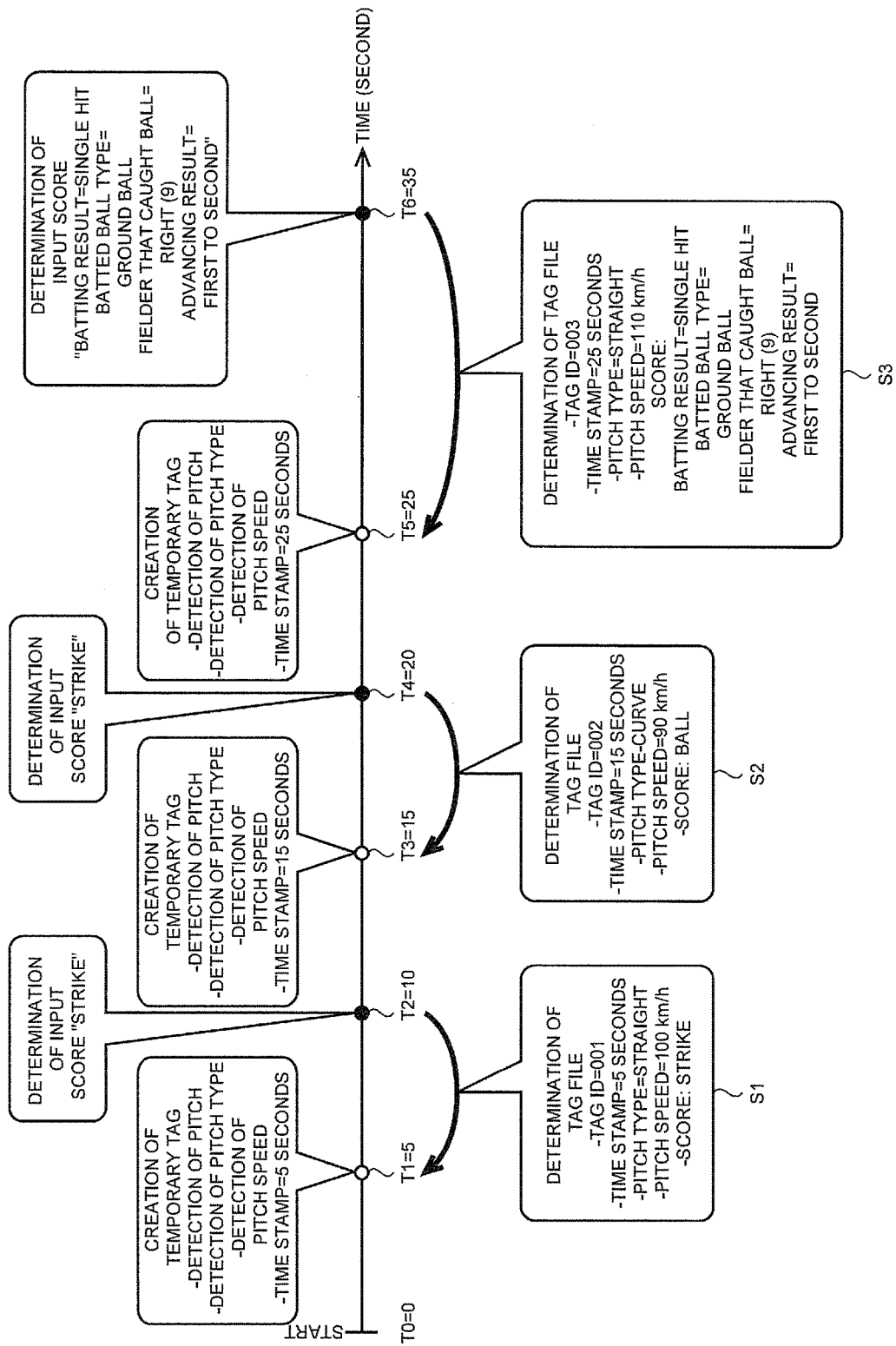
FIG. 3 is a time chart for explaining an operation example of the scorebook creating system according to the embodiment.

Subsequently, an operation of each component shown in FIG. 2 is explained with time by using a time chart shown in FIG. 3. In this operation, first, a baseball game is actually imaged using the imaging device 110. At this time, imaging is performed with an imaging range including a pitcher in an angle of view. An imaging starts at timing T0 (=0 second). At timing T0, it is supposed that an application (for example, the scorebook processing unit 127 and the tag-ID assigning unit 128) for creating a scorebook is running in the scorebook creating apparatus 120, and that communication is established between the scorebook creating apparatus 120 and the imaging device 110. Furthermore, in the scorebook creating apparatus 120, scores are started to be input by an input operator as soon as a pitcher starts pitching. While a baseball is being imaged with these components, the input operator inputs scores in parallel thereto.

Scores recorded in a scorebook are explained briefly. A score (second information) is a set of score information, and is an aggregate of score information that is an individual event constituting a series of events that start from a pitch (first information) of a pitcher. Therefore, one score is created for every time of pitching of the pitcher. For example, when a batting result is a fly out to right field in a state in which a runner is on first base, and a first-base runner is also tagged out, the score information indicating that the batter is out, the score information indicating the right fly out, and the score information indicating that the first-base runner is out constitute one score.

In addition to the score information exemplified above, scores can include score information about an action of a batter, an action of a fielder, count determination, an advance state of a runner when the runner has already been on base, and other action of the batter or the fielder. Specifically, the scores can include score information indicating a strike, a ball, a foul, a batting result, a type of a batted ball, the fielder who has caught a ball, an advancing result, and the like. The batting result is information indicating, an out, a single, a double, a triple, a homerun, and the like. The type of the batted ball is information indicating a grounder, a liner, a fly, a bunt, and the like, and may be classified in further detail. The fielder who has caught a ball is information to identify the fielder that actually caught the batted ball, or a position of the fielder. The advancing result, such as 'first base to second base' is information relating to the advance of a runner that have been on base, and can include, in addition, other play of the batter or the fielder and the like.

A series of score information included in one score is successively input, for example, by operating the input unit 125 based on a GUI that is created by the GUI-image creating unit 129 according to a command from the scorebook processing unit 127, and that is displayed on the display unit 124. The input operator inputs determination operation through the input unit 125 when input of all of a series of the score information is completed to be in a state which can be determined, and thereby an aggregate of score information relating to a series of events starting from a pitch of a pitcher is determined as one score.

In the imaging device 110, imaging is started by pressing an imaging button of the operating unit 117 by an imaging operator. Picture data acquired by the imaging unit 111 by starting imaging is accumulated in the storage unit 114.

The detecting unit 112 detects timing for creating a temporary tag (for example, timing T1, T3, T5). The timing for creating the temporary tag may be given to the detecting unit 112 by operating a button of the operating unit 117 by the imaging operator, or may be detected by analyzing, by the detecting unit 112, picture data that is input from the imaging unit 111. When detecting timing for creating the temporary tag by analyzing picture data, an event to be detected as timing for creating the temporary tag by the detecting unit 112 may be timing of a pitch by a pitcher, and the like. Moreover, an external device (hereinafter, "remote control device for tag") to issue timing for creating the temporary tag may be provided in addition to the imaging device 110. The remote control device for tag may be integrated in the scorebook creating apparatus 120, or may be a communication terminal that is independent of the imaging device 110 and the scorebook creating apparatus 120.

The temporary-tag creating unit 115 stores time information when the detecting unit 112 detects a timing for creating a temporary tag temporarily in the storage unit 114 as temporary-tag time information. This operation is referred to as "creating a temporary tag".

On the other hand, in the scorebook creating apparatus 120, score information is input by an input operator that watches an actual game through the input unit 125, and when input of a series of the score information is completed, a score is determined (for example, timing T2, T4, T6) by making determination operation for the input unit 125 by the input operator. At a time when the score is determined, it is in a state in which time has passed from the time when the pitch by the pitcher is detected by the detecting unit 112.

When the score is determined, a tag ID is issued by the tag-ID assigning unit 128, and the score and the tag ID are stored in the storage unit 122 in a set. The tag ID includes time information indicating time when the score is determined. Furthermore, the issued tag ID is transmitted to the imaging device 110 through the communication I/F 121 to be input to the temporary-tag creating unit 115 in the imaging device 110. In the temporary-tag creating unit 115, the last temporary-tag time information before the score is determined is identified in the storage unit 114, and this temporary-tag time information and the input tag ID are written in a temporary tag file in the storage unit 114 in a set. Alternatively, the temporary-tag creating unit 115 may register the temporary-tag time information detected by the detecting unit 112 sequentially into a register or the like, and may write, when the tag ID is received from the scorebook creating apparatus 120, the oldest temporary-tag time information out of the temporary-tag time information that is the temporary-tag time information registered in the register or the like and that is not put into a set with the tag ID, with the received tag ID in a set in the temporary tag file in the storage unit 114.

As describe, the score that is determined at a time when time has passed since the pitch is detected is associated with the last temporary-tag time information before the score is determined by the tag ID. That is, the tag ID is information to identify a combination of the temporary-tag time information and the score. By using this tag ID, a series of the score information starting from the pitch can be associated retroactively with the time point of the pitch which is the starting point of a batting result in the picture data.

Picture data from a time point when the temporary-tag time information is assigned to a time point when the next temporary-tag time information is assigned is defined as a scene. The scene can be thereby defined per picture starting from a pitch of a pitcher. Each scene is associated with the temporary-tag time information by using the time information included in the picture data. Each scene and the tag ID are associated as a result of this association, and thereby each scene and the score are associated with each other.

Figure 4:
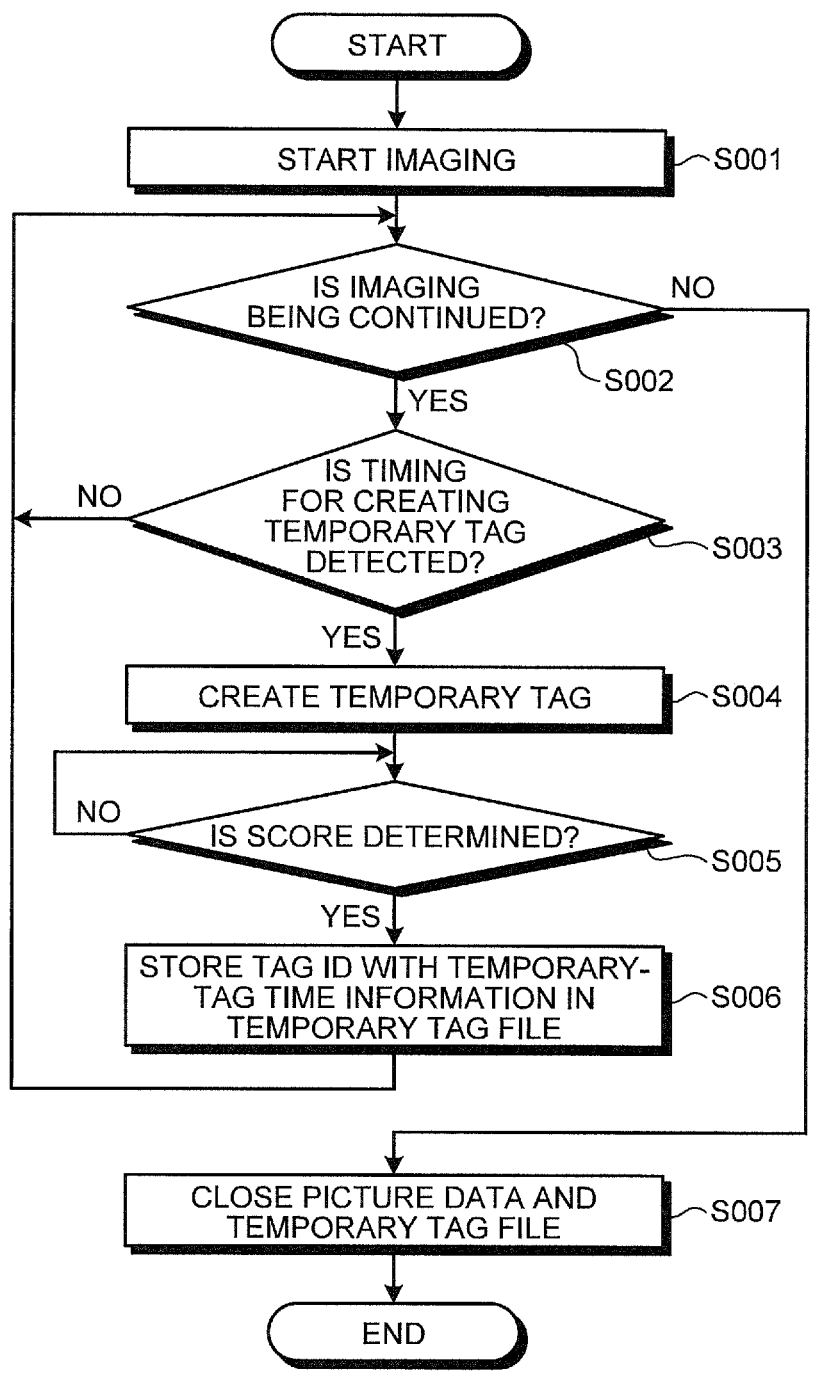
FIG. 4 is a flowchart showing an outline of an operation example of an imaging device in the scorebook creating system according to the embodiment.
Figure 5:
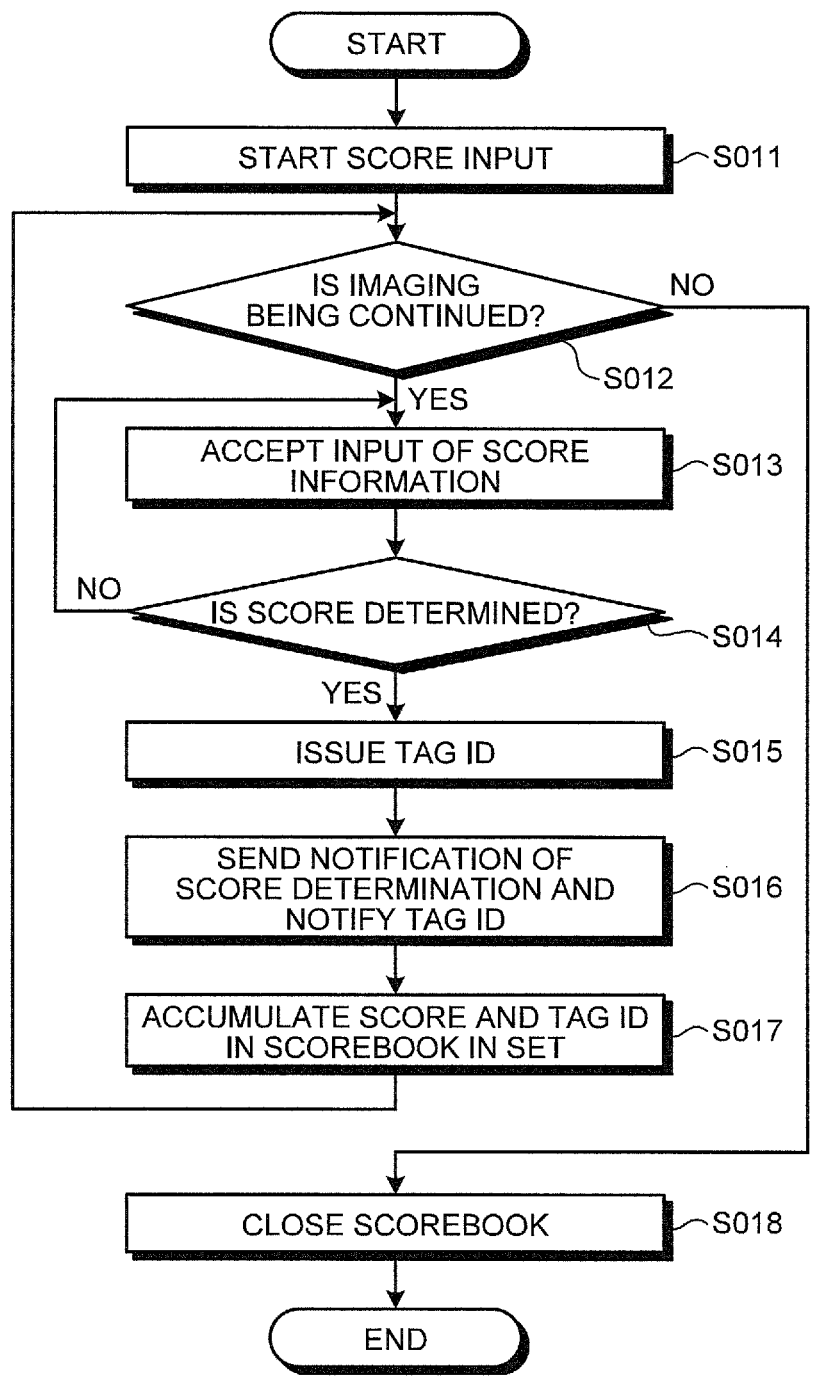
FIG. 5 is a flowchart showing an outline of an operation example of a scorebook creating apparatus in the scorebook creating system according to the embodiment.

Next, an operation of each component shown in FIG. 2 is explained in detail by an operation flow of the imaging device 110 shown in FIG. 4 and an operation flow of the scorebook creating apparatus 120 shown in FIG. 5.

The operation of the imaging device 110 shown in FIG. 4 is started by an operator that operates the imaging device 110. On the other hand, the operation of the scorebook creating apparatus 120 shown in FIG. 5 is started as a result of starting a scorebook creating application of the scorebook creating apparatus 120 by an input operator. In this case, it is preferable that the input operator of scores should input at such a position from which the entire game site is viewed and movement of a batted ball and of all of the players can be observed. It is more preferable to be in seats behind the plate or in stands from which the entire site can be looked down, rather than to be at a position from which the game site is viewed from the side, such as a bench.

First, the operation of the imaging device 110 is explained. At step S001 in FIG. 4, imaging by the imaging device 110 is started at a start of a game, by operating the operating unit 117 of the imaging device 110 by an operator.

At step S002, it is checked whether the imaging is being continued or not. An imaging status indicating whether imaging is being continued or not is held by, for example, the imaging unit 111. When the imaging is being continued, that is, during the imaging continues, it shifts to step S003. When the imaging is not being continued, it shifts to step S007. Note that when the imaging is suspended, it is kept checking whether the imaging is being continued until either resumption of the imaging or termination of the imaging is detected.

At step S003, timing for creating a temporary tag by the detecting unit 112 of the imaging device 110 is detected. As described above, the timing for creating the temporary tag may be given to the detecting unit 112 by operating a button of the operating unit 117 by the imaging operator, may be detected by analyzing, by the detecting unit 112, picture data that is input from the imaging unit 111, or may be given to the detecting unit 112 from an external device such as a remote control device for tag. Moreover, when timing for creating a temporary tag is not detected at step S003, it returns to step S002, and whether the imaging is being continued is checked.

When timing for creating a temporary tag is detected by analyzing picture data, the detecting unit 112 may detect a pitch by detecting a pitching form of a pitcher that is, for example, analyzed with the picture image to evaluate a coincidence level with a pitching form reference. Alternatively, a pitch may be detected by detecting a case in which, on imaging a pitcher and a catcher from their side, the extended line of a path of a ball overlaps with the pitcher and does not bound around the catcher.

Instead of detecting a pitch by analyzing the picture data, a pitch may be detected by using a speed gun to detect an output signal of speed of a ball that is pitched from a pitcher toward a catcher. Alternatively, a predetermined threshold value may be set to the speed, and a pitch may be detected when the speed equal to or higher than the threshold value is detected. By using the speed gun, pitching can be detected even when a pitcher is not included in an imaging range of the imaging device 110, and each score information included in scores of the scorebook can be associated with a scene of the picture data.

Furthermore, when timing for creating a temporary tag is detected by analyzing the picture data, the detecting unit 112 may detect information about a pitch type or a pitch speed of the ball pitched by a pitcher in addition thereto. The information thus detected may be transmitted to the scorebook creating apparatus 120, and be included in the score information in the scorebook creating apparatus 120.

At step S004, when the detecting unit 112 detects timing for creating a temporary tag at step S003, the temporary-tag creating unit 115 of the imaging device 110 creates a temporary tag, triggered by the detection of this timing. In creation of a temporary tag, the temporary-tag creating unit 115 identifies time information of when the timing for creating the temporary tag is detected using the internal clock 113, and stores it temporarily in the storage unit 114 as temporary-tag time information of the time information. The time information may be, for example, elapsed time from a start of imaging, or may be a current time. Moreover, the temporary-tag time information may take a form of, for example, timestamp.

On the other hand, on the side of the scorebook creating apparatus 120, a score input operation per pitch is being processed by the input operator. When the score input operation per pitch is completed, determination of scores is notified to the imaging device 110 from the scorebook creating apparatus 120 (refer to step S016 in FIG. 5). At step S005 in FIG. 4, the imaging device 110 waits until the notification of the score determination is received from the scorebook creating apparatus 120 (step S005: NO), and when the notification of the score determination is received (step S005: YES), processing at step S006 is performed.

A case in which determination of scores is made without detecting timing for creating a temporary tag for some reason, for example on a case in which a pitch by a pitcher is not detected, is herein explained. If timing for creating a temporary tag is not detected, temporary-tag time information to be associated with is not to be present. Therefore, temporary-tag time information is newly issued by a method applying either one of three patterns: (1) at a time point when scores are determined, (2) at a time point when a predetermined time has passed since scores are determined, and (3) at a time point when a predetermined time has passed since the previous determination of scores. However, as for (3), since no previous point is exited at the first determination of scores after imaging, a temporary tag is issued using (1) or (2). Thus, even when scores are determined without detecting timing for creating a temporary tag, temporary-tag time information can be given.

Explanation returns to FIG. 4. When the tag ID is received with the notification of the score determination from the scorebook creating apparatus 120, the imaging device 110 inputs the received tag ID to the temporary-tag creating unit 115. At step S006, the temporary-tag creating unit 115 writes the created temporary-tag time information and the tag ID in a temporary tag file in a set, and it returns to step S002.

By performing accumulation of the picture data, the temporary-tag time information and the tag ID associated therewith all through a game, the picture data and the temporary tag file of one game is stored in the storage unit 114 of the imaging device 110.

At step S007, since the imaging is not being continued (step S002: NO), the imaging device 110 closes the picture data and the temporary tag file accumulated in the storage unit 114 to complete the process.

Subsequently, an operation of the scorebook creating apparatus 120 is explained. At step S011 in FIG. 5, a score input operation is started by operating the input unit 125 of the scorebook creating apparatus 120 by the input operator.

At step S012, it is checked whether imaging by the imaging device 110 is being continued or not. An imaging status indicating whether imaging is being continued or not is checked by inquiring of the imaging unit 111 of the imaging device 110 by the scorebook processing unit 127. When the imaging is being continued, that is, during the imaging continues, it shifts to step S013. When the imaging is not being continued, it shifts to step S018. Note that when the imaging is suspended, it is kept checking whether the imaging is being continued or not until either resumption of the imaging or termination of the imaging is detected.

At step S013, the scorebook processing unit 127 accepts score information per pitch that is input using the input unit 125. The input operator performs determination operation through the input unit 125 when input of all of the score information relating to a series of events starting from a pitch of a pitcher is completed. Then the scorebook processing unit 127 determines a set of the accepted score information as scores corresponding to a series of events starting from a pitch of a pitcher (step S014: YES).

When the scores are determined as described above, at step S015, the tag-ID assigning unit 128 issues a tag ID. After acquiring the tag ID from the tag-ID assigning unit 128, the scorebook processing unit 127 notifies the acquired tag ID with the notification of the score determination to the imaging device 110 (step S016). Moreover, the scorebook processing unit 127 accumulates the acquired ID and the input scores in the storage unit 122 in a set (step S017), and it returns to step S012.

By performing accumulation of the scores and the tag IDs all through a game as described above, a scorebook including the scores and the tag IDs of one game is stored in the storage unit 122 of the scorebook creating apparatus 120.

At step S018, since the imaging is not being continued (step S012: NO), the scorebook processing unit 127 closes the scorebook in the storage unit 122 to complete the process.

As described above, temporary-tag time information is assigned to all of the time points of a pitch in imaged picture image, the temporary-tag time information and the tag IDs are stored in the temporary tag file, and further, a series of score information (that is, scores) starting from a pitch is associated with the tag ID, and thereby a score per pitch of the scorebook and a scene of the picture data are associated with each other.

Although a case in which a tag ID is used for associating temporary-tag time information with a score has been explained in the above explanation, it is not limited thereto. For example, instead of the tag ID, time information (time or time information from a beginning of imaging or from a beginning of the picture data) that is acquired by the internal clocks 113 and 131 may be used. In that case, a combination of temporary-tag time information and a score that are associated with each other can be specified based on a temporal context of the time information, and therefore, components to transmit a tag ID from the tag-ID assigning unit 128 and the scorebook creating apparatus 120 to the imaging device 110, and an operation thereof can be omitted.

Moreover, although a temporary tag file and a scorebook are stored as separate data in the present embodiment, tag data in which both the temporary tag file and the scorebook are combined may be created.

When a temporary tag file and a scorebook are combined into a single piece of tag data, at step S007 in FIG. 4, the temporary tag file accumulated in the storage unit 114 is transmitted to the scorebook creating apparatus 120 through the communication I/F 116. The scorebook creating apparatus 120 creates tag data by associating temporary-tag time information included in the temporary tag file and scores included in the scorebook based on a tag ID.

In formation included in the tag data thus created information such as a tag ID, temporary-tag time information, a pitch type, a pitch speed, a score, a score determination time are included. The created tag data is stored in the storage unit 122 of the scorebook creating apparatus 120.

Figure 6:
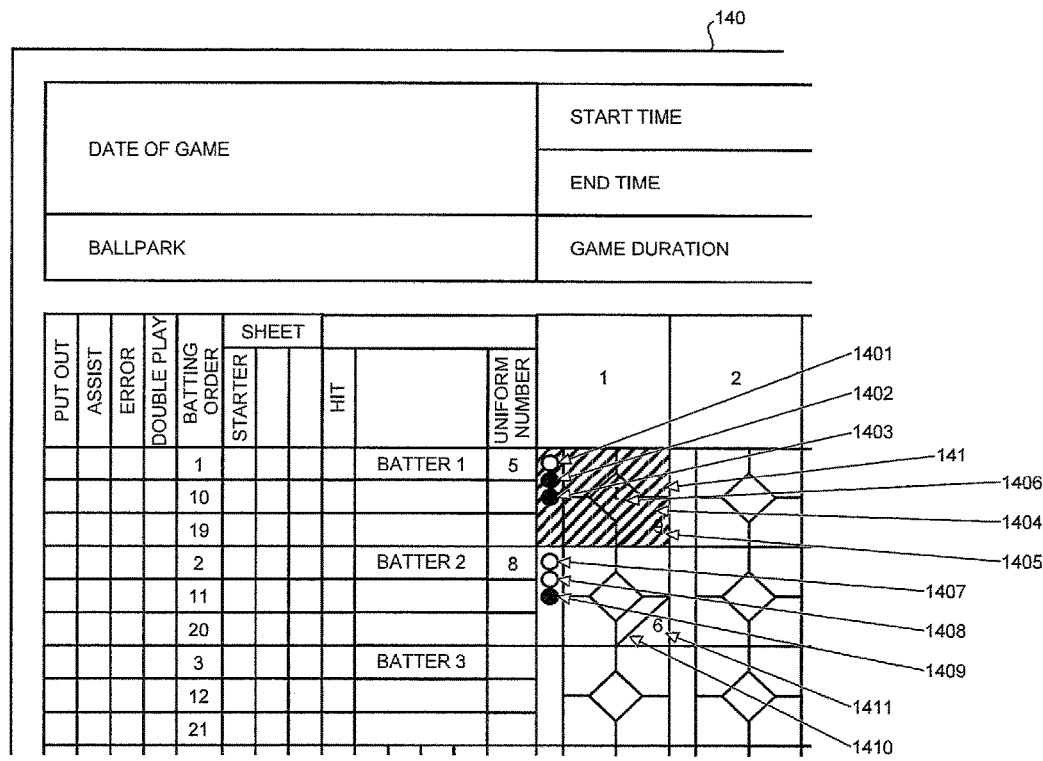
FIG. 6 depicts one example of a scorebook that is created in the embodiment.
Figure 7:
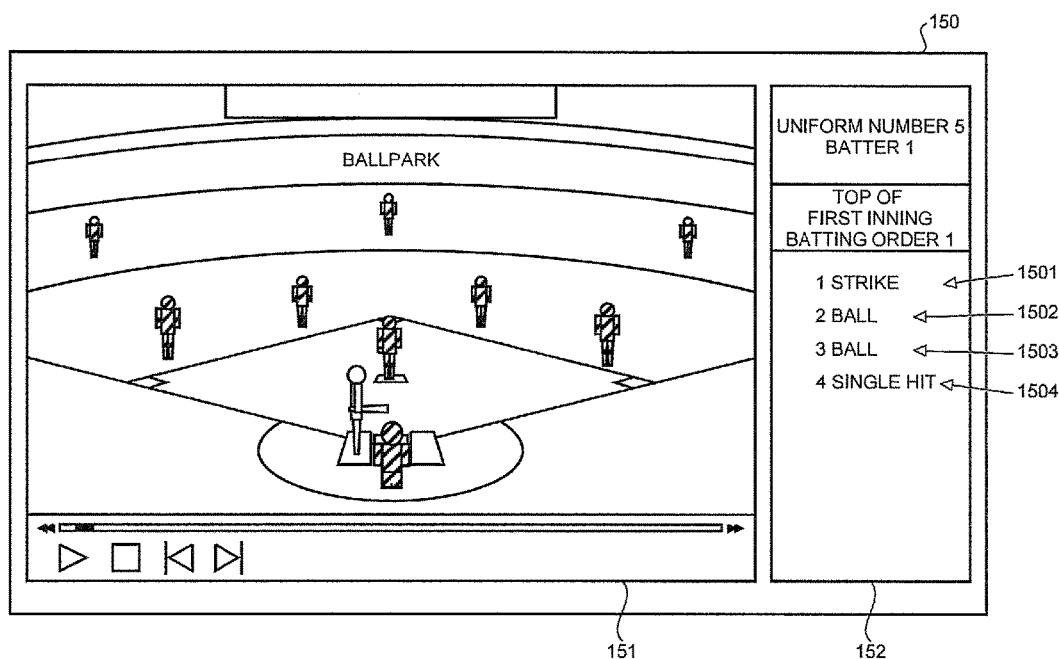
FIG. 7 depicts one example of a reproduced picture.

Subsequently, a flow of reproducing a target scene in picture data by using a scorebook that is thus associated with the picture data is explained in detail below using the drawings. FIG. 6 depicts one example of a scorebook that is created by the scorebook processing unit 127 using a scorebook accumulated in the storage unit 122, and is displayed on the display unit 124. FIG. 7 depicts one example of a reproduced picture that is called by using the scorebook shown in FIG. 6 and reproduced on the display unit 124.

First, when an operator inputs a command for displaying a scorebook through the input unit 125, the scorebook processing unit 127 acquires data of the scorebook from the storage unit 122, and displays the scorebook that is created by the GUI-image creating unit 129 based on the acquired data on the display unit 124. Thus, on the display unit 124, the scorebook 140 as shown in FIG. 6 is displayed, for example, in the present embodiment.

In a score section 141, a count, which is score information, such as a strike and a ball is displayed on the left. A strike is expressed by a symbol of a white circle, and a ball is expressed by a black circle. On the right side of the score section 141, base advancement, which is score information, is displayed. In a diamond section on the right side of the score section 141, a count corresponding to out, which is score information, is displayed. Cells are arranged so as to surround the diamond section in center, at lower right, upper right, upper left, and lower left, respectively. When a straight line parallel to each side of the diamond in center is drawn in each cell, it indicates that a runner has advanced to bases. That is, when a straight line is drawn in the lower right cell, it indicates that a runner has advanced to first base as score information. Similarly, it respectively signifies score information indicating that a runner has advance to second base when a straight line is drawn in the upper lest cell, score information indicating that a runner has advance to third base when a straight line is drawn in the upper left cell, and score information indicating that a runner has advance to home base when a straight line is drawn in the lower left cell.

In the lower right cell, a number indicating a fielder that has caught a batted ball is shown. In the present embodiment, an example is indicated in which it is determined that a pitcher is '1', a catcher is '2', a first base man is '3', a second base man is '4', a third base man is '5', a shortstop is '6', a left fielder is '7', a center fielder is '8', and a right fielder is 9° as information given in advance so that a position can be identified uniquely.

In FIG. 6, it is indicated, by the straight line 1404 and a player number that caught the ball 1405, that after the count of a strike 1401, a ball 1402, and a ball 1403, a batter 1 having a uniform number 5 advanced to first base with a hit to be caught by the right fielder 9, and became out after the advance to first base was completed. Moreover, it is indicated, by the straight line 1410 and a player number that caught the ball 1411, that after the count of a strike 1407, a strike 1408, and a ball 1409, a batter 2 having a uniform number 8 advanced to first base with a hit to be caught by the shortstop 6. There are records of advances to first base of two people. This indicates that in addition to an out 1406, although the hit by the batter 2 that was caught by the shortstop 6 enabled the batter 2 to advance to first base, the batter 1 failed to advance to second base, to become the out 1406. 1401 to 1411 are to be the score information.

A flow when a target scene is reproduced by using scores based on the score information described above is explained below.

FIG. 7 depicts one example of displaying all scores for an at-bat of a batter and a reproduced picture. A picture-data reproducing screen 150 is displayed divided into a display unit for displaying reproduced picture data 151 and an at-bat information 152. On the display unit for displaying reproduced picture data 151, a picture to be reproduced is displayed. In the at-bat information 152, all scores in the at-bat of the batter are displayed (1501 to 1504). By selecting one of these scores by an operator, the beginning of a scene that corresponds to the score of the at-bat information 152 selected by the operator, that is, the picture for a pitching scene is reproduced.

As described, according to the embodiment, scores of each at-bat in the scorebook and the picture data of the at-bat can be linked, and therefore, the desired picture can be easily checked from the scorebook. As a result, detailed information of each at-bat, such as a cooperation state of fielders and an advancing state of a runner, can be easily acquired.

Figure 8:
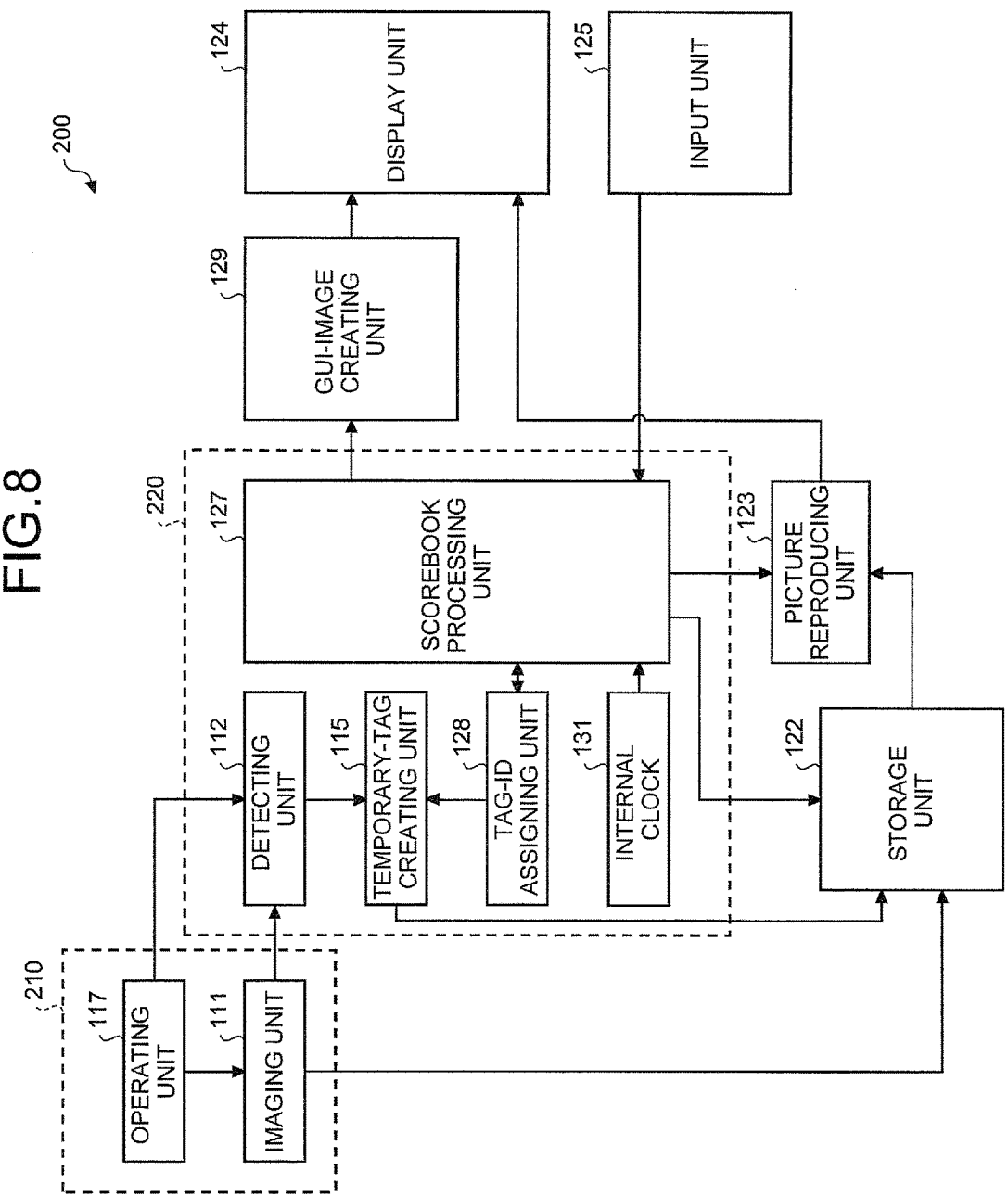
FIG. 8 is a block diagram showing a schematic configuration example of a scorebook creating system according to another embodiment.

Another embodiment of a scorebook creating system is shown in FIG. 8. A scorebook creating system 200 is constituted of a scorebook creating apparatus 220 that includes the picture reproducing unit 123, the scorebook processing unit 127, the tag-ID assigning unit 128, the internal clock 131, the detecting unit 112, and the temporary-tag creating unit 115, and an imaging device 210 that includes the imaging unit 111 and the operating unit 117. The storage unit 122 accumulates and stores picture data transmitted from the imaging unit 111, temporary tags created by the temporary-tag creating unit 115, scores created by the scorebook processing unit 127, and tag IDs issued by the tag-ID assigning unit 128 as a result of determination of scores. Each block performs the same operation as that of the block of a corresponding reference symbol described above. A difference is that the communication I/Fs 116 and 121 are not included.

The scorebook creating apparatus 220 shown in FIG. 8 can reproduce a scene corresponding to a score that is associated with a tag ID corresponding to the score and the tag ID included in a temporary tag file, from the beginning of the scene. The storage unit 122 is arranged externally from the scorebook creating apparatus 220, and stores the picture data, the temporary tags, the scores, and the tag IDs. The storage unit 122 may be arranged inside the scorebook creating apparatus 220. Moreover, the storage unit 122 may be replaced with a storage unit that is equipped in the imaging device 210 and stores the picture data, the temporary tag IDs, and the tag IDs, and also with a storage unit that is equipped in the scorebook creating apparatus 220 and that stores the scores and the tag IDs.

A data structure example of a temporary tag file that is created in the embodiment described above is explained below. FIG. 9 is a schematic diagram showing a data structure example of a temporary tag file that is created by the operation of the imaging device 110 explained using FIG. 4 in the above description. As shown in FIG. 9, in a temporary tag file, temporary-tag time information and a tag ID are stored associated with each other. The temporary-tag time information is only required to be information, such as elapsed time from a start of imaging and a current time as exemplified above, enabling to identify a starting point of a scene in the picture data.

Next, a data structure example of a scorebook that is created by the embodiment described above is explained. FIG. 10 is a schematic diagram showing a data structure example of a scorebook that is created by an operation of the scorebook creating apparatus 120 explained using FIG. 5 in the above description. In the example shown in FIG. 10, scores of the fifth batter to the ninth batter in the top of the second inning are partially shown.

As shown in FIG. 10, the data structure of a scorebook is constituted of multiple batting records. One batting record is created each time a score is determined, and a batting record number is assigned thereto in ascending order as an index.

In the batting record, score information as follows is recorded. For example, information about an inning, the top/end of an inning, a personal ID to identify a batting order and a batter, "batter score information", "runner score information", and a "tag ID" is recorded therein. That is, it has a data structure in which one score is recorded for each batting record. The personal ID is information to identify each player independently, and is associated with information such as name of a corresponding player by a not shown table, and the like.

The batter score information corresponds to score information, such as an action of a batter, an action of a fielder, count determination, an advancing state of a runner if there is the runner that has been advanced, and other actions of the batter and the fielder in the score information described above. The score information about the other actions indicates an irregular event that should be recorded separately from regular scores, namely, a disturbance to the batter, a disturbance to the fielder, a dropped third strike, a balk, and the like.

The runner score information corresponds to score information of an advancing result in the score information described above. This runner score information is recorded in a score in a batting record of a batter, for example, for each runner of each base. Furthermore, in the runner score information, an individual ID to identify a runner of each base is also included. That is, in the batting record, the score of the runner other than the batter is recorded.

Figure 11:
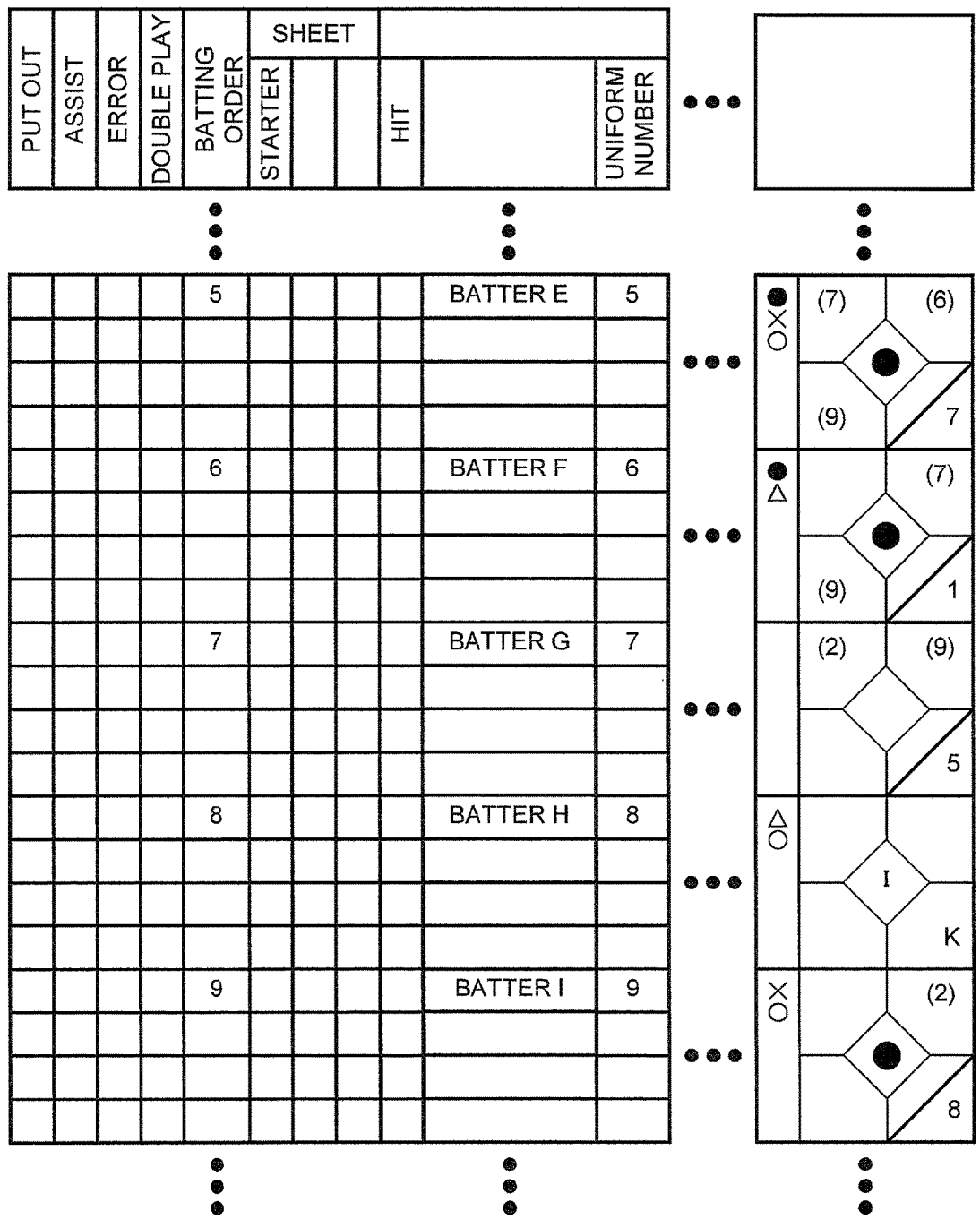
FIG. 11 depicts one example of a scorebook (a graphical user interface (GUI) image) that is created from the scorebook shown in FIG. 10.
Figure 12:
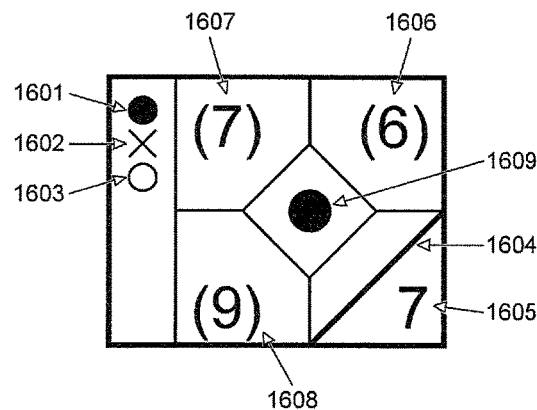
FIG. 12 is an enlarged view of a score section of a batter, a batting order of which in FIG. 11 is "5"

FIG. 11 depicts one example of a scorebook (a GUI image) that is created based on a batting record of data of the scorebook shown in FIG. 10 and is displayed on the display unit 124. With an example of a score section of a batter of the batting order "5" in FIG. 11, an item that is selectable by an operator that reproduces a picture is explained. FIG. 12 is an enlarged view of the score section of the batter, the batting order of which in FIG. 11 is "5". In the score section shown in FIG. 12, pitching results 1601 to 1603, a batting result 1604, a batted ball direction (or a fielder that caught the ball) 1605 are displayed based on score information of a batting record number "A005". Moreover, advancing information 1606 from first base to second base based on runner score information of a batting record number "A011", advancing information 1607 from second base to third base based on runner score information of a batting record number "A012", advancing information 1608 from third base to home base based on runner score information of a batting record number "A018", and other score information 1609 similarly based on runner score information of a batting record number "A018" are displayed. As described, the score information corresponding to one at-bat of the batter of the batting order "5" is displayed based on the batting records relating to other batters. For the pitching results 1601 to 1603, information indicating a strike, a ball, a foul, and the like is expressed with symbols such as a black circle and a white circle in time series. For the batting result 1604, a batting result such as a single, a double, a triple, and a homerun, is expressed by a diagonal line. For the batted ball direction 1605, the direction of the batted ball is expressed by a fielder that caught the ball or a position thereof, and the like. For the other score information 1609, information indicating that the batter of the batting order "5" crossed the plate, information that the batter became out, and the like are indicated. In the case of FIG. 12, it indicates information that the batter of the batting order "5" crossed the plate.

For the advancing information 1606 to 1608, information indicating a batting order of the batter whose batting makes the batter of the batting order "5" advanced to each base is shown in parentheses. In the example shown in FIG. 12, a number in parentheses indicates the batting order of the batter that caused the advance. The score information used to create these pieces of the advancing information 1606 to 1608 are not the score information identified by the score of the batting order "5" shown in FIG. 10, but the score information that is identified by the runner information that is recorded in the batting record of the batter indicated by the number in the parentheses that has caused the advance. That is, the advancing information 1606 to 1608 in the respective score sections of the scorebook displayed on the display unit 124 are created by referring not only the scores of said batting order, but also the batting records of other batters after said batting order until the same batting order appears again. Specifically, from the runner score information of the batting records of other batters later than the batting order 5 and previous to the batting order 5 appearing again, the runner score information having the same personal ID as the personal ID of the batter of said batting order 5 are all identified, and using this identified runner score information, the score section of the batter of the batting order 5 is created.

Furthermore, the score information (1601 to 1609) explained in FIG. 12 is an item selectable for an operator to reproduce a picture. Accordingly, either one of the score information (1601 to 1609) is selected, the temporary-tag time information is identified by the tag ID that is associated with the score including the score information, and reproduction of the corresponding scene is started from a pitching scene. For example, when the score information 1606 is selected, the reproduction of a scene that is identified by the tag ID "TG0021" associated with the score of the batting record "A011" in which the corresponding score information is included is started from a pitching scene. Note that when a region inside each score section, for example, a region inside a score section and other than a portion in which the score information (1601 to 1609) is displayed is selected, the reproduction may be started from a scene corresponding to the beginning of an at bat to which the selected score section corresponds.

Figure 13:
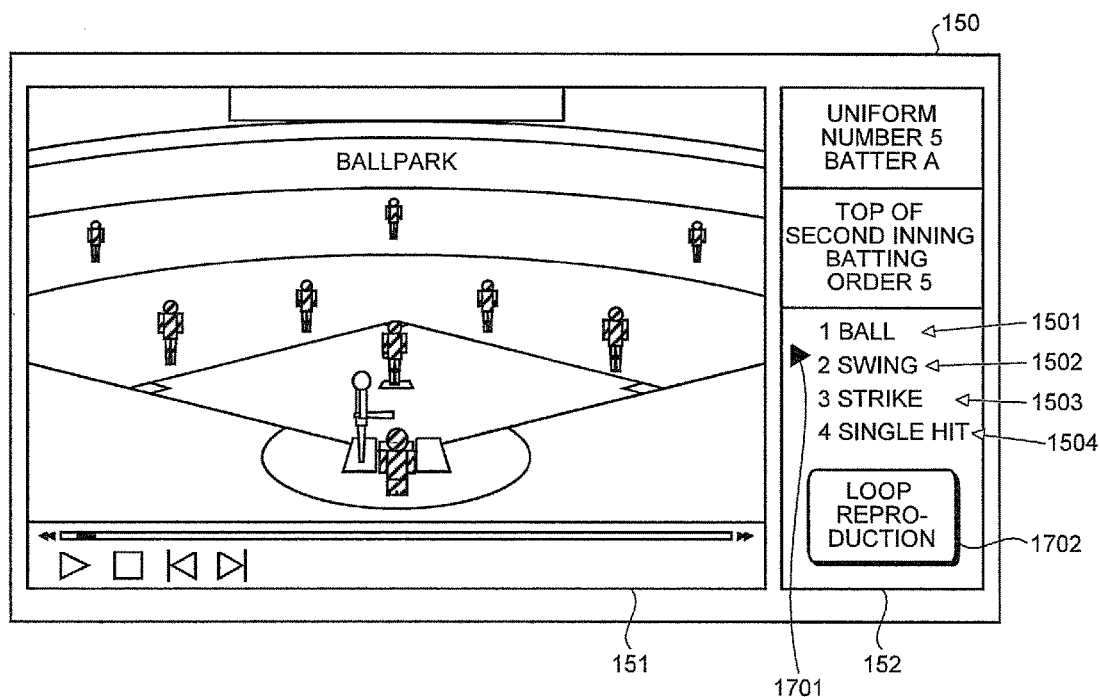
FIG. 13 depicts a modification example of a picture-data reproducing screen according to the embodiment.

FIG. 13 depicts a modification example of a picture-data reproducing screen shown in FIG. 7. As shown in FIG. 13, on the reproduction screen, in addition to display contents exemplified in FIG. 7, information 1701 indicating which scene is currently being reproduced, a loop reproduction button 1702 to select whether to reproduce repeatedly an at-bat (or scene) currently being reproduced, and the like may be displayed. When the loop reproduction button 1702 is selected by the operator, the corresponding at-bat (or scene) is reproduced on the display unit for displaying reproduced picture data 151 repeatedly.

The information 1701 indicating which scene is currently being reproduced indicates, with a mark of a triangle or the like, information that indicates, for example, which scene out of the scores 1501 to 1505 displayed in the at-bat information 152 is currently being reproduced on the display unit for displaying reproduced picture data 151. Therefore, when the scene being reproduced on the display unit for displaying reproduced picture data 151 is switched to the following scene, the information 1701 indicating which scene is currently being reproduced is also switched to the following score information. In addition to the information 1701 indicating which scene is currently being reproduced, a method such as emphasized display may be applied also to the corresponding score information (1601 to 1609) in the scorebook displayed on the display unit 124, to show which scene is currently being reproduced to the operator.

Next, an operation when a target at-bat is cued and reproduced by using a scorebook is explained in detail using the drawing. FIG. 14 is a flowchart showing one example of a reproducing operation according to the embodiment. Note that reproduction of a picture with cueing may be performed by various kinds of information processing devices, such as the scorebook creating apparatus 120, the imaging device 110, and other personal computers. However, a device that performs reproduction is supposed to be configured to be accessible to at least one storage region in which picture data, a temporary tag file, and a scorebook are stored. In this configuration, a file system, a server/client information processing system, cloud computing, and the like on a network are included. In the following explanation a case in which the scorebook creating apparatus 120 holds picture data, a temporary tag file, and a scorebook, and a picture is reproduced by the scorebook creating apparatus 120 is exemplified.

As shown in FIG. 14, in a reproduction with cueing operation, the scorebook processing unit 127 reads a scorebook that is stored in the storage unit 122 (step S101), displays a GUI image of the scorebook created by the GUI-image creating unit 129 using the read scorebook on the display unit 124 (step S102). Subsequently, the scorebook processing unit 127 waits until the operator makes an operation of selecting a score (or score information) in the displayed scorebook (step S103: NO), and when selection of a score is made using the input unit 125 (step S103: YES), identifies a score corresponding to the selected score from the scorebook in the storage unit 122 (step S104).

Next, the scorebook processing unit 127 reads all scores corresponding to the at-bat including the identified score (step S105) (that is, all scores that are acquired from the innings recorded in the batting record which includes the identified score as well as the other batting records the batting record number of which, corresponding to the batting order, is adjacent to each other), creates a picture-data reproducing screen 150 as exemplified in FIG. 13 by using the all scores (step S106), and displays the created picture-data reproducing screen 150 on the display unit 124 (step S107). Note that at step S107, a picture is not yet reproduced in the display unit for displaying reproduced picture data 151. Moreover, a score that is identified at step S105 is not limited to all scores corresponding to an at-bat including the selected score, but may be, for example, all of the scores after the selected score out of the scores corresponding to the at-bat including the selected score, or the like.

Subsequently, the scorebook processing unit 127 identifies temporary-tag time information from a temporary tag file by using a tag ID of the first score of the all scores read at step S105 (step S108). Subsequently, the scorebook processing unit 127 commands the picture reproducing unit 123 to perform cueing of the corresponding scene (the first scene of the at-bat including the selected score, or the scene corresponding to the selected score) based on the identified temporary-tag time information (step S109), and reproduces a picture from the cued scene in the display unit for displaying reproduced picture data 151 of the picture-data reproducing screen 150 on the display unit 124 (step S110).

Subsequently, the scorebook processing unit 127 determines whether selection of a score is made in the scorebook displayed on the display unit 124 (step S111) and whether an interrupted command for ending the reproduction of the picture is accepted (step S112) before the reproduction of the corresponding at-bat is ended (step S113: YES). When selection of a score is made in the scorebook (step S111: YES), the scorebook processing unit 127 identifies a score corresponding to the selected score from the scorebook in the storage unit 122 (step S104), and performs the following operation. Furthermore, when the interrupted command for ending the reproduction of the picture is accepted (step S112: YES), the scorebook processing unit 127 closes the picture-data reproducing screen 150 that is displayed on the display unit 124, and ends this operation.

When selection of a score is not made to the scorebook (step S111: NO), and the interrupted command for ending the reproduction of the picture is not accepted (step S112: NO), and then the reproduction of the corresponding at-bat is ended (step S113: YES), the scorebook processing unit 127 determines, for example, whether the loop reproduction button 1702 in the at-bat information 152 of the picture-data reproducing screen 150 is in a selected state (step S114) or not, and when it is in a selected state (step S114: YES), returns to step S110 to perform again the reproduction of the scene that has been cued, and repeats the operation thereafter. On the other hand, when the loop reproduction button 1702 is not in a selected state (step S114: NO), the scorebook processing unit 127 determines whether the reproduction is finished until the end of the picture data (step S115), and when the reproduction is not completed until the end of the picture data (step S115: NO), identifies the score that is registered in the scorebook following the last score out of the scores corresponding to the at-bat reproduced this time (step S116). Subsequently, the scorebook processing unit 127 returns to step S105, and reproduces a scene of the next at-bat by performing the operation thereafter. On the other hand, when the reproduction is completed until the end of the picture data (step S115: YES), the scorebook processing unit 127 closes the picture-data reproducing screen 150 displayed on the display unit 124, and ends this operation.

As described above, according to the above embodiments, a score of each at-bat in a scorebook and picture data of an at-bat relating to the score can be linked, and therefore, a desired picture can be easily checked from the scorebook. As a result, detailed information of each at-bat, such as a cooperation state of fielders and an advancing state of a runner, can be easily acquired.

Although in the embodiments of the present invention, a batting record is created each time a score is determined, one batting record may be assigned collectively per batting order, and multiple scores may be included in the same batting record. Thus, extraction of scores per at-bat is facilitated.

Although the embodiments of the present invention have been explained with an example of baseball, the present invention is applicable to softball, kickball, tea ball, and the like having similar game process. In tea ball in which no pitcher exists, the present invention can be implemented by detecting a moment when a ball placed on a batting tea is hit by a batter to issue a temporary tag.

According to the embodiments of the present invention, it is possible to provide a scorebook creating apparatus, a scorebook creating system, a scorebook creating method, a program, an imaging device, and a reproducing method that enable to facilitate confirmation of a desired picture.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A scorebook creating apparatus comprising:
a detecting unit that detects first information that indicates a starting point of a scene included in picture data;
a temporary-tag creating unit that creates a temporary tag including time information of the first information when the detecting unit detects the first information;
a scorebook processing unit into which second information as score information is input after a time of the time information, and determines a score based on the second information so as to create a scorebook;
a tag-identification (ID) assigning unit that issues a tag ID and assigns the tag ID to the score which is determined; and
a picture reproducing unit that displays the picture data and the score, wherein
the temporary-tag creating unit makes a last temporary tag before the tag ID is issued so as to associate the time information of the last temporary tag with the tag ID,
the picture reproducing unit reads, when a displayed score is selected, the tag ID assigned to the score selected, and displays a scene at the time of the time information which is associated with a read score, and
a plurality of pieces of the score for one at-bat is stored as a single batting record, comprising
identifying, when selection of the score is accepted in the scorebook, the batting record that includes the score;
identifying the temporary tag ID that is associated with an oldest score out of the pieces of the scores included in the identified batting record by the tag-ID; and
identifying the starting point of the scene in the picture data by the time information included in the identified temporary tag.

2. The scorebook creating apparatus according to claim 1, further comprising:
a storage unit that stores the picture data, the temporary tag, the second information, and the tag ID.

3. The scorebook creating apparatus according to claim 2, wherein
the storage unit includes
a first storage unit that stores the picture data, the temporary tag, and the tag ID; and
a second storage unit that stores the second information and the tag ID.

4. The scorebook creating apparatus according to claim 3, wherein
the first information is a pitching form of a pitcher that is included in the picture data.

5. The scorebook creating apparatus according to claim 4, wherein
the first information includes at least one of a pitch type and a pitch speed of a pitch by a pitcher as third information, and
the scorebook processing unit includes the third information in the scorebook.

6. The scorebook creating apparatus according to claim 3, wherein
the first information is an output signal from a speed gun.

7. A scorebook creating system comprising:
an imaging unit that images a picture to create picture data;
a detecting unit that detects first information that indicates a starting point of a scene included in the picture data;
a temporary-tag creating unit that creates a temporary tag including time information of the first information when the detecting unit detects the first information;
a scorebook processing unit into which second information as score information is input after a time of the time information, and determines a score based on the second information so as to create a scorebook;
a tag-identification (ID) assigning unit that issues a tag ID and assigns the tag ID to the score which is determined;
a storage unit that stores the picture data, the temporary tag, the second information, and the tag ID; and
a picture reproducing unit that displays the picture data and the score, wherein
the temporary-tag creating unit makes a last temporary tag before the tag ID is issued so as to associate the time information of the last temporary tag with the tag ID,
the picture reproducing unit reads, when a displayed score is selected, the tag ID assigned to the score selected, and displays a scene at the time of the time information which is associated with a read score, and
a plurality of pieces of the score for one at-bat is stored as a single batting record, comprising
identifying, when selection of the score is accepted in the scorebook, the batting record that includes the score;
identifying the temporary tag ID that is associated with an oldest score out of the pieces of the scores included in the identified batting record by the tag-ID; and
identifying the starting point of the scene in the picture data by the time information included in the identified temporary tag.

8. A scorebook creating method that is performed by a system including a detecting unit, a temporary-tag creating unit that creates a temporary tag, a tag-ID assigning unit that issues a tag ID, a scorebook processing unit that creates a scorebook, and a picture reproducing unit that displays a picture data and a score, the method comprising:
   detecting, by the detecting unit, first information that indicates a starting point of a scene included in the picture data;
   creating, by the temporary-tag creating unit, a temporary tag including time information of the first information when the detecting unit detects the first information;
   creating, by the scorebook processing unit, a scorebook by determining a score based on second information, the second information as score information is input into the scorebook processing unit after a time of the time information;
   issuing, by the tag-ID assigning unit, a tag ID to assign the tag ID to the score which is determined; and
   making, by the temporary-tag creating unit, a last temporary tag before the tag ID is issued so as to associate the time information of the last temporary tag with the tag ID,
   reading, when a displayed score is selected, the tag ID assigned to the score selected and displaying a scene at the time of the time information which is associated with a read score, by the picture reproducing unit, wherein
a plurality of pieces of the score for one at-bat is stored as a single batting record, comprising
identifying, when selection of the score is accepted in the scorebook, the batting record that includes the score;
identifying the temporary tag ID that is associated with an oldest score out of the pieces of the scores included in the identified batting record by the tag-ID; and
identifying the starting point of the scene in the picture data by the time information included in the identified temporary tag.

9. A non-transitory computer-readable medium storing a program that causes an apparatus that includes a detecting unit, a temporary-tag creating unit that creates a temporary tag, a tag-ID assigning unit that issues a tag ID, a scorebook processing unit that creates a scorebook, and a picture reproducing unit that displays picture data and a score to function, the program causing:
   the detecting unit to detect first information that indicates a starting point of a scene included in the picture data;
   the temporary-tag creating unit to create a temporary tag including time information of the first information when the detecting unit detects the first information;
   the scorebook processing unit, into which second information as score information is input after a time of the time information, to determine the score based on the second information so as to create a scorebook;
   the tag-ID assigning unit to issue a tag ID to assign the tag ID to the score which is determined;
   the temporary-tag creating unit to make a last temporary tag before the tag ID is issued so as to associate the time information of the last temporary tag with the tag ID;
   the picture reproducing unit to read, when a displayed score is selected, the tag ID assigned to the score selected, and to display a scene at the time of the time information which is associated with a read score, wherein
a plurality of pieces of the score for one at-bat is stored as a single batting record, comprising
identifying, when selection of the score is accepted in the scorebook, the batting record that includes the score;
identifying the temporary tag ID that is associated with an oldest score out of the pieces of the scores included in the identified batting record by the tag-ID; and
identifying the starting point of the scene in the picture data by the time information included in the identified temporary tag.

10. A reproducing method that is performed by an apparatus accessible to at least one storage region in which picture data, a temporary tag including time information of first information that indicates a starting point of a scene included in the picture data, a score constituting a scorebook, and a tag ID that associates the temporary tag with the score, the method comprising:
   determining the score based on second information input after a time of the time information,
   storing a plurality of pieces of the score for one at-bat as a single batting record,
   setting the tag ID with a last temporary tag before the tag ID is issued so as to associate the time information of the last temporary tag with the tag ID,
   identifying, when selection of the score is accepted in the scorebook, the batting record that includes the score;
   identifying the temporary tag that is associated with an oldest score out of the pieces of the scores included in the identified batting record by the tag ID;
   identifying the starting point of the scene in the picture data by the time information that is included in the identified temporary tag; and
   reproducing the picture data from the identified starting point of the scene.

* * * * *